US008424955B2

(12) United States Patent
Heuel et al.

(10) Patent No.: US 8,424,955 B2
(45) Date of Patent: Apr. 23, 2013

(54) SLIDING DOOR FOR A VEHICLE (75) Inventors: Gerhard Heuel, Olpe (DE); Michael Krehmke, Plettenberg (DE); Ralf Rottmann, Drolshagen (DE)

(73) Assignee: Dura Automotive Body & Glass Systems GmbH (DE)

(*) Notice: Subject to any disclaimer, the term of this patent is extended or adjusted under 35 U.S.C. 154(b) by 164 days.

(21) Appl. No.: 12/960,989

(22) Filed: Dec. 6, 2010

(65) Prior Publication Data
US 2011/0131767 A1  Jun. 9, 2011

(30) Foreign Application Priority Data

Dec. 7, 2009  (DE) .......................... 10 2009 057 300

(51) Int. Cl.
*B60J 5/00* (2006.01)
(52) U.S. Cl.
USPC ........................................................ 296/155
(58) Field of Classification Search ................. 296/155, 296/146.12, 146.11; 49/360
See application file for complete search history.

(56) References Cited

U.S. PATENT DOCUMENTS

| 3,935,674 A * | 2/1976 | Williams et al. ................ 49/212 |
| 4,738,003 A * | 4/1988 | Mori et al. ...................... 16/321 |
| 6,851,743 B2 * | 2/2005 | George et al. .................. 296/202 |
| 7,178,853 B2 * | 2/2007 | Oxley et al. .............. 296/146.11 |
| 7,574,828 B2 * | 8/2009 | Yokomori et al. .............. 49/358 |
| 7,765,740 B2 * | 8/2010 | Heuel et al. ..................... 49/360 |
| 2009/0000200 A1 * | 1/2009 | Heuel et al. .................... 49/209 |

FOREIGN PATENT DOCUMENTS

| DE | 10 2008 016 650 B3 | 5/2009 |
| DE | 10 2008 026 137 A1 | 12/2009 |
| EP | 2 008 846 A2 | 12/2008 |

* cited by examiner

*Primary Examiner* — Glenn Dayoan
*Assistant Examiner* — Pinel Romain
(74) *Attorney, Agent, or Firm* — Alleman Hall McCoy Russell & Tuttle LLP; Dean Watson

(57) ABSTRACT

A sliding door for a vehicle comprises a guide rail and a sliding carriage which is longitudinally movably mounted on the guide rail and which is connected with the vehicle body by a multiple joint. The sliding door furthermore comprises a centering element at its end facing away from the multiple joint. To improve such sliding door, the centering element includes a centering surface which rests against the counter surface integral with the body, when the sliding door is closed.

14 Claims, 8 Drawing Sheets

SLIDING DOOR FOR A VEHICLE

CROSS REFERENCE TO RELATED APPLICATION

This application claims priority to German Patent Application No. 10 2009 057 300.3, entitled "Sliding Door for a Vehicle", filed Dec. 7, 2009, which is hereby incorporated by reference in its entirety for all purposes.

TECHNICAL FIELD

The present disclosure relates to a sliding door for a vehicle, in particular for a motor vehicle.

BACKGROUND AND SUMMARY

The sliding door comprises a guide rail, a sliding carriage and a centering element. The sliding carriage is longitudinally movably mounted on the guide rail and connected with the vehicle body by a multiple joint. The centering element is provided at the end of the sliding door facing away from the multiple joint.

Such sliding door is known from DE 10 2008 016 650 B3, to which reference is made here expressly. In this sliding door, the multiple joint comprises a hinge stirrup which is rotatably mounted on the sliding carriage and on a body flange, and a control lever which is rotatably mounted on the sliding carriage and on a or the body flange. The prior art sliding door furthermore comprises a first intermediate lever which is rotatably mounted on the control lever, and a second intermediate lever which is rotatably mounted on the first intermediate lever and on the sliding carriage. At the end facing away from the multiple joint, the sliding door is rotatably and longitudinally movably mounted by a centering element. It can be locked there. The control lever includes an extension on which the first intermediate lever is rotatably mounted. At the connecting joint of the first intermediate lever and of the second intermediate lever a guide pin is provided, which is guided in a guideway provided at the sliding door. The guideway extends inclined relative to the guide rail. The guideway extends inclined outwards in a direction away from the hinge stirrup.

Another sliding door as mentioned above is described in EP 2 008 846 A2, to which reference likewise is made here expressly. Here, a drive rod is present, which is rotatably mounted on the control lever. At the end facing away from the multiple joint, the sliding door is rotatably and longitudinally movably mounted by a centering element. It can be locked there. The drive rod is rotatably mounted on the guide rail. The control lever includes a lever arm on which the drive rod is rotatably mounted. At an intermediate lever, which is rotatably mounted on the sliding carriage, a guide pin is provided, which is guided in a guideway provided at the sliding door.

From the non-prepublished prior German Patent Application 10 2008 026 137.8, to which reference likewise is made here expressly, another sliding door of the type mentioned above is known. Here, the control lever includes a lever arm on which a guide pin is provided, which is guided in a guideway provided at the sliding door. The guideway preferably extends inclined outwards in a direction away from the hinge stirrup.

In the prior art sliding doors, the centering element is formed by a U-shaped receptacle at the end of the sliding door facing away from the multiple joint, which is provided at the sliding door and extends inclined with respect to the longitudinal direction of the vehicle, and by a hinge bolt which is provided at a body flange and engages in the U-shaped receptacle, where it can be locked in place.

It is the object of the present disclosure to propose an improved sliding door of the type mentioned above.

According to a first proposal, this object is solved in that the centering element includes a centering surface which rests against a counter surface integral with the body, when the sliding door is closed. This provides for reliably centering the sliding door in the closed position.

The centering surface can include a portion which extends inclined with respect to the longitudinal direction of the vehicle. The counter surface integral with the body preferably is formed correspondingly. The portion of the centering surface extending inclined with respect to the longitudinal direction of the vehicle preferably is inclined forwards and to the inside in direction of the vehicle. Advantageously, the inclined portion of the centering surface is flat.

Another advantageous development is characterized in that the centering surface includes a portion which extends parallel to the longitudinal direction of the vehicle. The counter surface integral with the body preferably is formed correspondingly. The portion extending parallel to the longitudinal direction of the vehicle preferably adjoins a portion which extends inclined with respect to the longitudinal direction of the vehicle. Preferably, it forms an end portion of the centering surface.

Advantageously, the centering element includes a catch hook. Preferably, a corresponding counter bearing for the catch hook is provided at the vehicle body. By means of the catch hook, an excessive deformation of the sliding door and corresponding disadvantageous consequences for the vehicle occupants can be avoided in the case of a side impact.

The catch hook forms a crash hook for a side impact at the sliding door. A counter bearing integral with the body preferably is provided opposite the catch hook.

The body-side counter surface can be provided at a cover. The cover can be attachable or attached to a body flange.

According to another proposal, for which protection is claimed independently, the object underlying the present disclosure is solved in that the centering element coverable by a covering cap. In particular, the centering element can be covered during a painting operation. In this way, a damage of the centering element can be avoided during the painting operation.

Advantageously, a rotary hinge axle can be mounted at the centering element. The rotary hinge axle can be mountable directly at the centering element. It is, however, also possible that instead or in addition the rotary hinge axle is mountable at the covering cap which covers the centering element.

The paintwork of a bodyshell sliding door of a motor vehicle and of a body-in-white of a motor vehicle takes place in several steps. In general, the body-in-white including the doors and lids passes through one or more immersion baths, for example a cleaning stage, a degreasing zone and/or a phosphating zone. In these immersion baths the body-in-white is rotated, so that it is required to fix the doors and lids to the body-in-white, in order to prevent them from moving uncontrolled. After the immersion baths, the body-in-white can pass through a washing installation. Thereafter, wet painting takes place, which can comprise the steps of priming, top coating and/or clear coating. During wet painting it is required to be able to open and close the doors and lids, so as to for example also paint the door apertures. After wet painting, the body-in-white passes through a drying stage in which it can be heated for example to 180° C. or some other temperature.

In certain method steps of the painting operation it thus is desirable or required that the bodyshell door takes a closed position or a position slightly ajar with respect to the closed position, in which the bodyshell door is fixed. The closed position is that position in which the bodyshell door fills the associated opening in the body-in-white, namely preferably in the same way as the finished door also fills the opening of the finished body.

In other method steps of the painting operation, however, it is desirable or required that the bodyshell door is removed from the associated door opening of the body-in-white.

Due to the fact that a rotary hinge axle is mountable at the centering element, it is possible to selectively move the sliding door into an open position or into a closed position during the painting operation.

Advantageously, the sliding door is adjustable in z-direction by the covering cap. The z-direction is the vertical direction.

The two solutions in accordance with the present disclosure can be combined with each other.

The present disclosure furthermore relates to a vehicle, in particular a motor vehicle, which is characterized by one or more sliding doors in accordance with the present disclosure.

An embodiment of the present disclosure will be explained in detail below with reference to the attached drawings.

DETAILED DESCRIPTION

Figure 1:
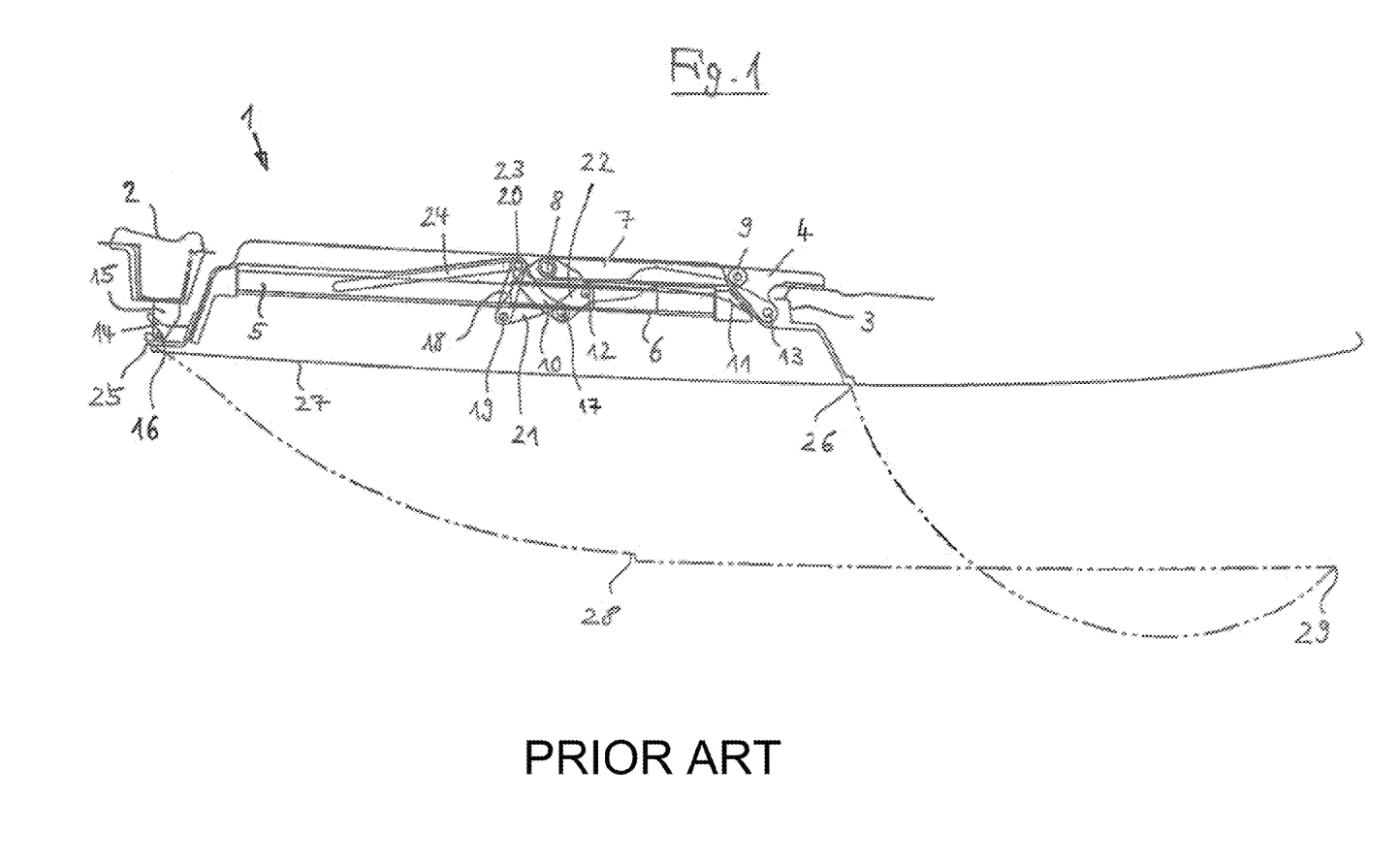
FIG. 1 shows a prior art sliding door for a motor vehicle in the closed position in a schematic view from above.
Figure 2:
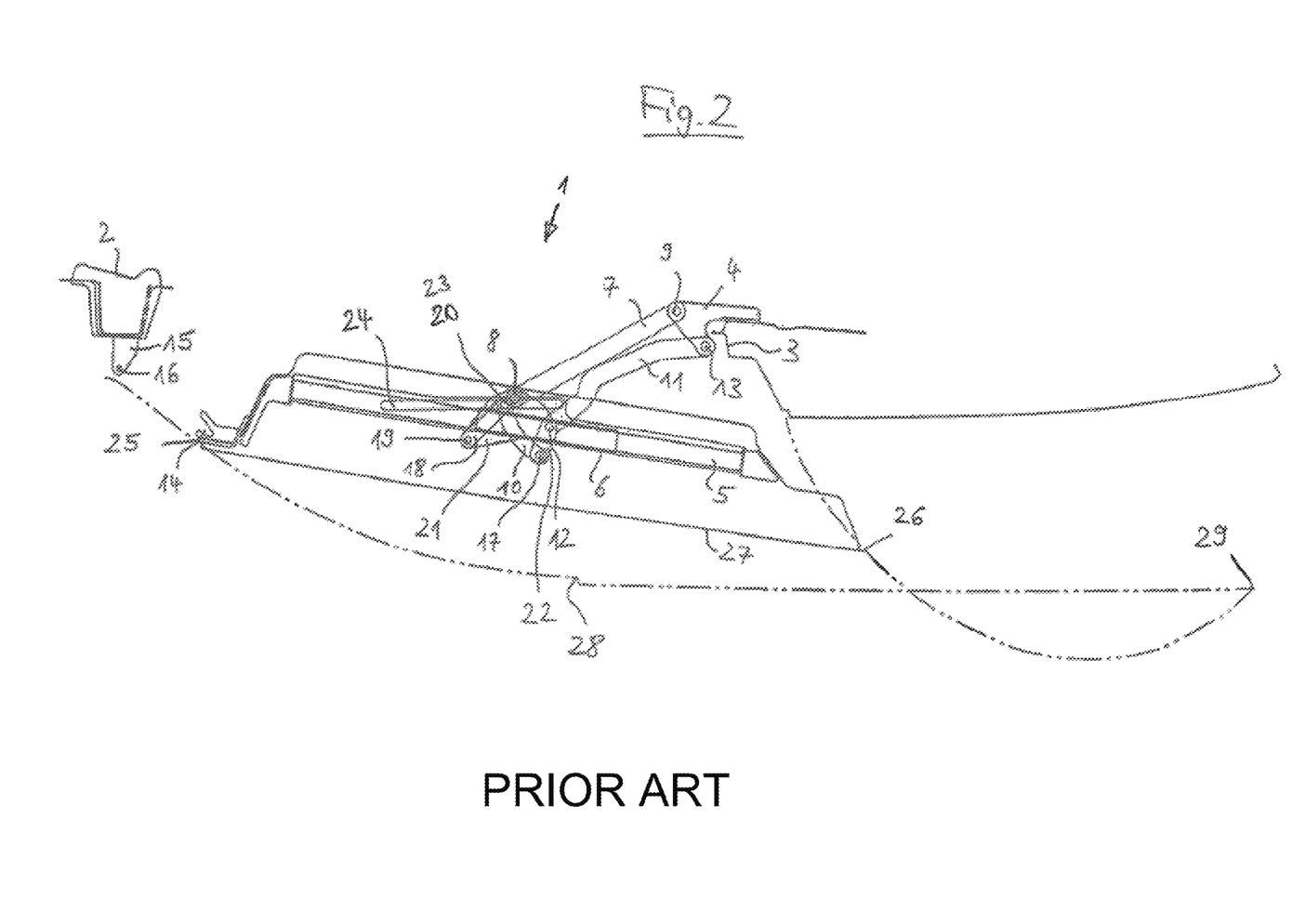
FIG. 2 shows the sliding door of FIG. 1 in a partly open position in a schematic view from above corresponding to FIG. 1.
Figure 3:
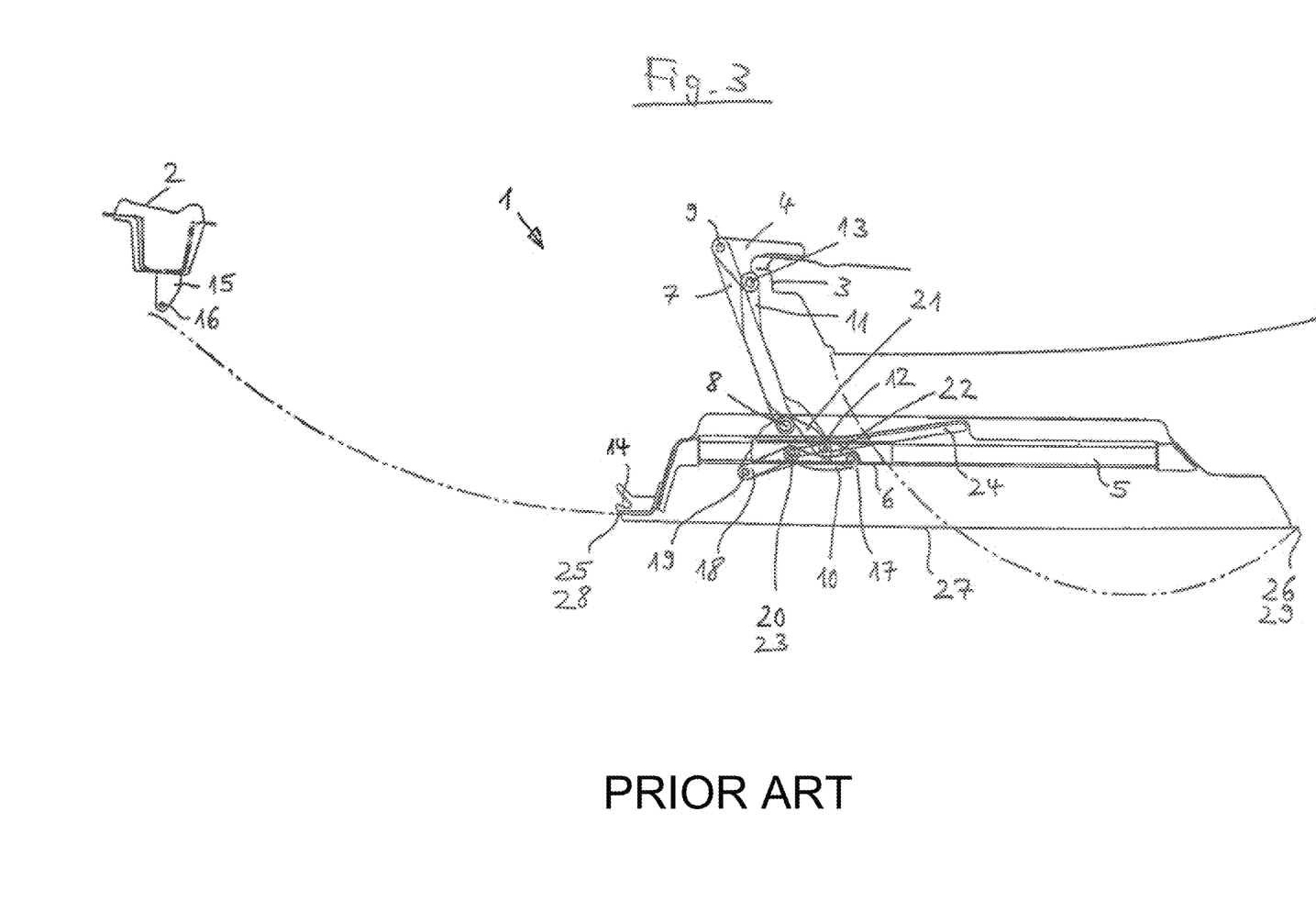
FIG. 3 shows the sliding door of FIGS. 1 and 2 in the completely open position in a schematic view from above corresponding to FIGS. 1 and 2.

FIGS. 1, 2 and 3 show the sliding door 1 according to an embodiment of DE 10 2008 016 650 B3. The sliding door 1 is the left rear door of a motor vehicle. It is disposed in the opening of the body between the B-pillar 2 and a rear body part 3 in whose region a body flange 4 is connected with the body. The rear body part 3 can be the C-pillar or the A-pillar.

On its inside, the sliding door 1 includes a guide rail 5. On the guide rail 5, a sliding carriage 6 is mounted in a longitudinally movable manner.

The sliding door 1 furthermore includes a hinge stirrup 7 and a control lever 11. The hinge stirrup 7 is rotatably mounted on the sliding carriage 6 about a joint 8 and on the body flange 4 about a joint 9. The control lever 11 is rotatably mounted on the sliding carriage 6 about a joint 12 and on the body flange 4 about a joint 13.

On the control lever 11 a first intermediate lever 10 is rotatably mounted, namely about the axis of a joint 17. On the sliding carriage 6 a second intermediate lever 18 is rotatably mounted, namely about the axis of a joint 19. The joint 19 is located in the outer region of the sliding carriage 6. It is located in the region of the front end of the sliding carriage 6. The ends of the intermediate levers 10, 18 facing away from the joints 17, 19 are rotatably connected with each other by a joint 20. The first intermediate lever 10 and the second intermediate lever 18 form a toggle lever. Since the connecting joint 20 of the intermediate levers 10, 18 is located further to the inside than the joints 17, 19 with respect to the motor vehicle, the toggle lever formed by the intermediate levers 10, 18 points to the inside with respect to the motor vehicle.

To the sliding carriage 6 a joint plate 21 is attached, which carries the joints 8, 12 and 19. The hinge stirrup 7, the control lever 11, the sliding carriage 6 as well as the hinge plate 21 and the body flange 4 form a multiple joint with the joints 8, 9, 12 and 13.

At the end of the sliding door 1 opposite the hinge stirrup 7 a U-shaped receptacle 14 is provided at the sliding door 1, which extends inclined with respect to the longitudinal direction of the vehicle, namely in vehicle direction forwards to the inside. It is open at its end facing away from the hinge stirrup 7, i.e. at its front inner end in this embodiment. On a body flange 15, which is attached to the B-pillar 2, a hinge bolt 16 is provided, which engages in the U-shaped receptacle 14. In the completely closed position of the sliding door as shown in FIG. 1, the hinge bolt 16 is located at the bottom of the U-shaped receptacle 14. It can be locked there (not shown in the drawing).

The control lever 11 includes an extension 22 which extends outwards from the joint 12. The extension 22 extends the control lever 11 along the connecting line from the joint 13 to the joint 12 beyond the joint 12. The extension 22 is slightly bent to the outside and to the rear, respectively, with respect to the connecting line between the joints 13 and 12, i.e. the longitudinal direction of the control lever 11. At the control lever 11, the joint 17 for the first intermediate lever 10 is provided in the region of the outer end of the extension 22.

At the connecting joint 20 of the first intermediate lever 10 and of the second intermediate lever 18, a guide pin 23 is provided, which is guided in a guideway 24. The guideway 24 is provided at the sliding door 1. Correspondingly, the guideway 24 is a guideway firmly mounted in the door. It extends with an inclination relative to the guide rail 5 in a direction away from the hinge stirrup 7 to the outside. The guideway 24 is configured continuously linearly. Its inclination is the same along its entire length.

In the completely closed position of the sliding door 1, which is shown in FIG. 1, the hinge bolt 16 lies in the U-shaped receptacle 14, namely in the region of its end. The guide pin 23 is located in the region of the rear, inner end of the guideway 24. The first intermediate lever 10 points forwards and to the inside from the joint 17. The second intermediate lever 18 points rearwards and to the inside from the joint 19.

In the course of the opening movement, the position as shown in FIG. 2 is passed through. This opening movement can be generated in that the guide rail 5 is moved to the rear relative to the sliding carriage 6. On the sliding carriage 6 a motor, in particular an electric motor, can be provided for driving the guide rail 5 relative to the sliding carriage 6. Instead or in addition a motor, in particular an electric motor, can be provided for driving the hinge stirrup 7 and/or the control lever 11. Advantageously, a motor for driving the hinge stirrup 7 and/or the control lever 11 is provided on the body flange 4 or some other body part.

The opening movement can, however, also be generated by hand instead or in addition. In particular, the guide rail 5 can manually be moved to the rear relative to the sliding carriage 6. For this purpose, a handle or several handles can be provided at the sliding door 1, by means of which the sliding door 1 and with the same the guide rail 5 can be moved relative to the sliding carriage 6. The handle can be provided at the inner front end of the sliding door 1 and/or at the outer front end of the sliding door 1 and/or at the outer rear end of the sliding door 1. The sliding door 1 can be opened and also be closed again by applying force at each of these three points.

Without the guide pin 23, the sliding carriage 6 might freely be shifted on the guide rail 5. The guide pin 23 guided in the guideway 24 prevents this free shiftability and defines the relative position of the sliding carriage 6 with respect to the guide rail 5 and hence with respect to the sliding door 1. This is effected in the portions of the guideway 24 which have an inclination different from zero with respect to the guide rail 5, i.e. do not extend parallel to the guide rail 5. The guideway 24 has the same inclination different from zero with respect to the guide rail 5 along its entire length.

When the guide rail 5 is moved to the rear relative to the sliding carriage 7 by motor and/or by hand, the guide pin 23 guided in the guideway 24 moves to the outside relative to the guide rail 5 and to the sliding carriage 6, whereby the second intermediate lever 18 is swivelled in clockwise direction about the joint 19. By moving the guide pin 23 relative to the sliding carriage 6 to the rear and to the outside, the joint 17 located at the other end of the first intermediate lever 10 likewise is moved to the rear, whereby the control lever 11 is rotated about the joint 12 in anti-clockwise direction. The control lever 11 thereby is swivelled in anti-clockwise direction about the joint 13 at the body flange 4. By swivelling the control lever 11, the hinge stirrup 7 is also swivelled in anti-clockwise direction about the joint 9. The joint plate 21 of the sliding carriage 6 likewise is forcibly guided by swivelling the hinge stirrup 7 about the joint 9, since it forms a multiple joint with the hinge stirrup 7, the control lever 11 and the body flange 4—as explained above.

The drive movement for opening the sliding door 1 can, however, also be initiated in some other way, in particular by a motorized and/or manual drive of the hinge stirrup 7 and/or the control lever 11 and/or the first intermediate lever 10 and/or the second intermediate lever 18 about one or more of the joints 9, 8, 13, 12, 17, 20, 19.

The completely open position of the sliding door 1 is shown in FIG. 3. The first intermediate lever 10 has been swivelled in clockwise direction about the joint 17 with respect to the extension 22 by about 90°. The guide pin 23 has reached the front, closed end of the guideway 24. The second intermediate lever 18 has been swivelled in clockwise direction about the joint 19 with respect to the sliding carriage 6 or the joint plate 21 by about 45°. The opening angle of the intermediate levers 10, 18 at the joint 20 has been increased from about 30° to about 150°. The control lever 11 and the hinge stirrup 7 have been swivelled by an angle of 120° in anti-clockwise direction about the joints 13 and 9.

When the sliding door 1 is to be closed, the described positions are passed through in reverse order. The closing movement of the sliding door 1 can be effected in that the guide rail 5 is moved forwards by motor and/or by hand relative to the sliding carriage 6. The relative movement of the guide rail 5 is transmitted by the guideway 24 to the guide pin 23 and from there introduced into the described multiple joint via the first intermediate lever 10. It is also possible, however, to initiate the closing movement in a way as it has been described for the opening movement.

In FIGS. 1, 2 and 3, the paths of the front end 25 and of the rear end 26 of the outer door panel 27 are illustrated. The front end 25 of the outer door panel 27 initially moves at an angle of about 30° with respect to the longitudinal axis of the vehicle to the rear and to the outside. The angle of inclination of the U-shaped receptacle 14 corresponds to this angle. Subsequently, it describes an arc with a large radius, whose end 28 includes a tangent extending parallel to the longitudinal axis of the vehicle. The rear end 26 of the outer door panel 27 initially moves approximately at right angles away from the body and then describes a narrowing arc up to an end point 29 which substantially has the same distance from the body of the vehicle as the end point 28 of the front end 25.

Figure 4:
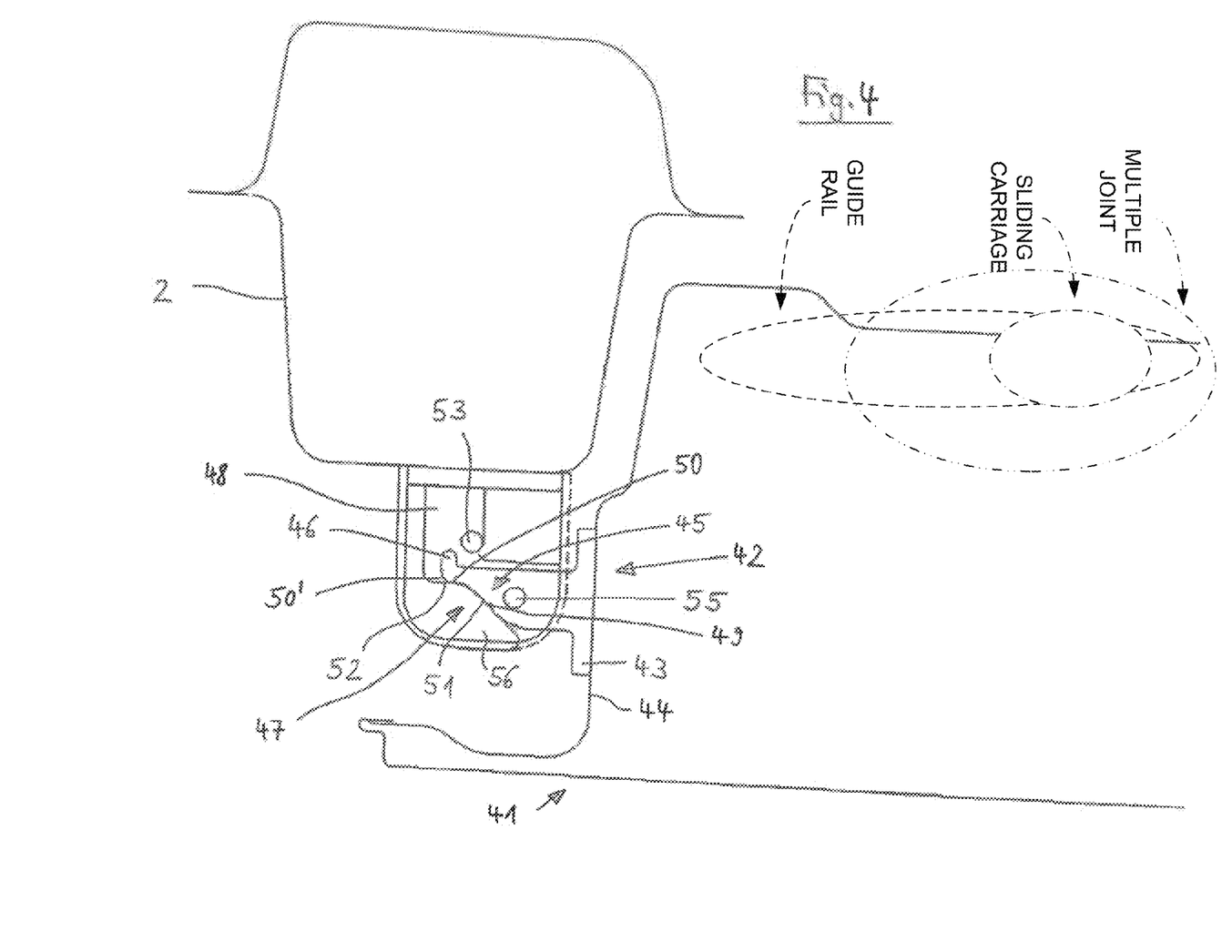
FIG. 4 shows the front part of a sliding door of the present disclosure of the type shown in FIGS. 1 to 3 in the closed position in a schematic view from above.
Figure 5:
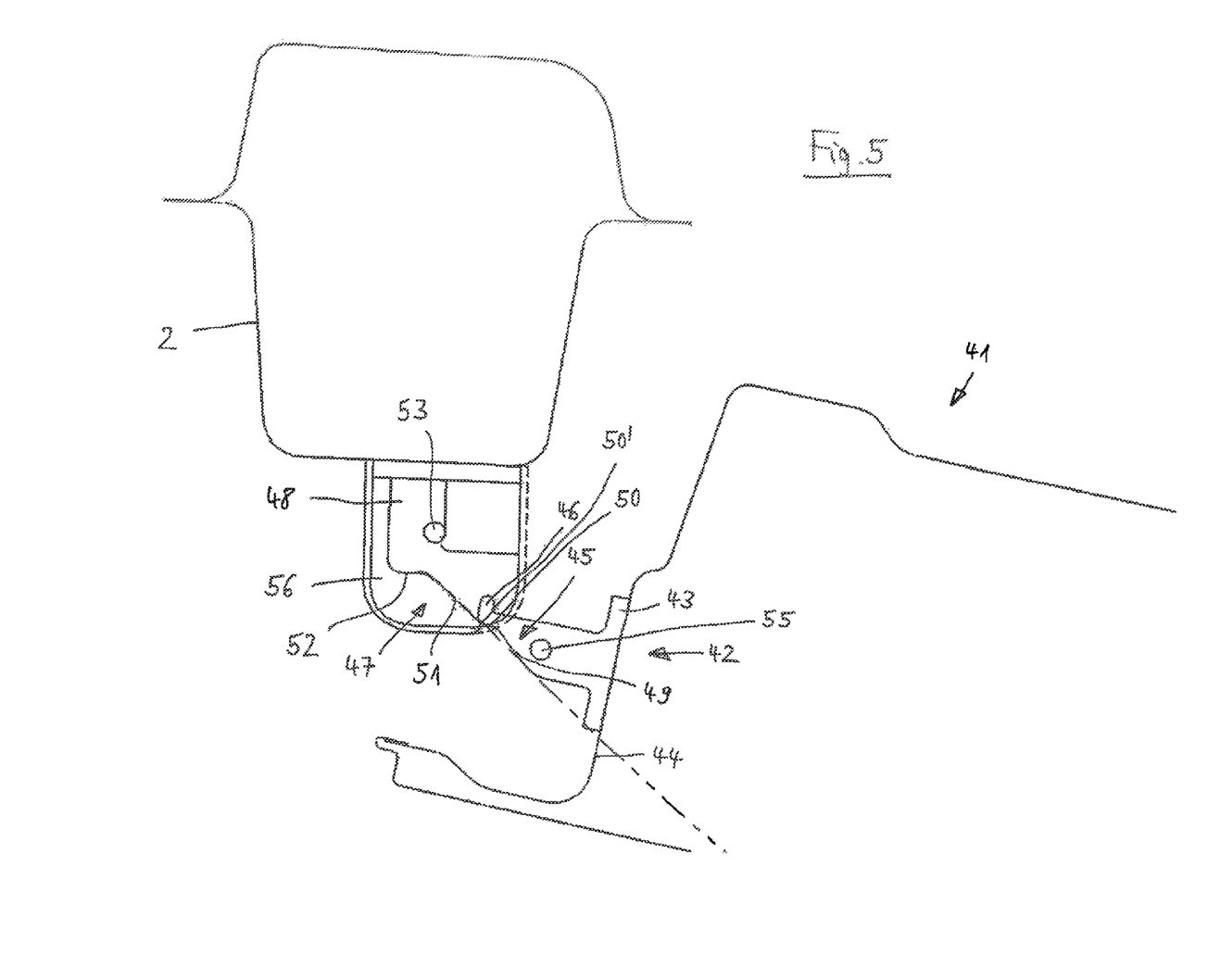
FIG. 5 shows the sliding door of FIG. 4 in a partly open position in a view from above corresponding to FIG. 4.

FIGS. 4 and 5 show the front part of a sliding door 41 of the present disclosure with a centering element 42 which is formed differently from the embodiment of FIGS. 1 to 3. In particular, sliding door 41 does not include a U-shaped receptacle, but does include a guide rail, sliding carriage, and a multiple joint. The guide rail, sliding carriage, and multiple joint are generally referred to in FIG. 4. While these elements are not visible in this view, the guide rail, sliding carriage, and multiple joint contribute to the sliding door mechanism. The centering element 42 is attached to the rear end of the sliding door 41. It comprises a mounting flange 43, which is attached to a front end panel 44 of the sliding door 41, a centering surface 45 and a catch hook 46.

When the sliding door is closed, the centering surface 45 rests against a counter surface 47 integral with the body. The counter surface 47 integral with the body is provided at a body-side cover 56 which covers a body flange 48 which is attached to the B-pillar 2.

The centering surface 45 includes a portion 49 which extends inclined with respect to the longitudinal direction of the vehicle. The portion 49 is inclined forwards and to the inside in direction of the vehicle. It is flat.

The centering surface 45 furthermore includes a portion 50 which extends parallel to the longitudinal direction of the vehicle. The parallel portion 50 adjoins the inclined portion 49. It forms the end portion of the centering surface 45. The parallel portion 50 lies before the inclined portion 49 in longitudinal direction of the vehicle. At its front end in longitudinal direction of the vehicle it includes a rounding 50'.

The counter surface 47 integral with the body is formed correspondingly. It comprises a flat, inclined portion 51 and an adjoining parallel portion 52. In the closed condition of the sliding door, the inclined portion 49 rests against the inclined portion 51, and the parallel portion 50 rests against the parallel portion 52. This provides for reliably centering the sliding door 41 in the closed position of the sliding door.

The catch hook 46 is located at the front end of the centering element 42. It is located opposite the parallel portion 50 of the centering surface 45. The catch hook 46 is directed to the inside in longitudinal direction of the vehicle. Opposite the same, a counter bearing 53 integral with the body is provided. The counter bearing 53 is provided or attached to the cover 56. It is located behind or inside the catch hook 46 in longitudinal direction of the vehicle. When the sliding door 41 is deformed to the inside in the case of a side impact, the rear region of the catch hook 46 gets in contact with the counter bearing 53 integral with the body, whereby an anchorage is formed for the sliding door 41, which exerts a resistance to a deformation of the sliding door 41 to the inside.

When the sliding door 41 is opened, the centering element 42 is moved from the position shown in FIG. 4 to the rear and to the outside. Due to the parallel portion 50 of the centering surface 45 of the centering element 42 and the associated parallel portion 52 of the counter surface 47 integral with the body of the body flange 48, the centering element 42 initially exclusively moves to the rear. Thereafter, when the length of the parallel portion 50 has been overcome, a movement to the outside is superimposed by the inclined portions 49, 51. The centering element 42 then moves uniformly to the rear and to the outside. During this movement, the rounding 50' at the front end of the parallel portion 50 of the centering surface 45 slides on the inclined portion 51 of the counter surface 47 integral with the body to the rear and to the outside. The end of this sliding movement is shown in FIG. 5, in which the rounding 50' at the front end of the parallel portion 50 is located at the rear, outer end of the inclined portion 51. Thereafter, the centering element 42 is lifted from the counter surface 47 integral with the body.

On closing of the sliding door 41, the reverse way is passed through. The rounding 50' at the front end of the parallel portion 50 gets in contact with the outer, rear end of the inclined portion 51 and subsequently slides along the inclined portion 51 forwards and to the inside. When the rounding 50' at the front end of the parallel portion 50 has reached the front inner end of the inclined portion 51, an exclusive movement to the front is made, which is terminated when the inclined portion 49 completely rests against the inclined portion 51, as is shown in FIG. 4. In this position, the sliding door 41 is latched completely and reliably.

Figure 6:
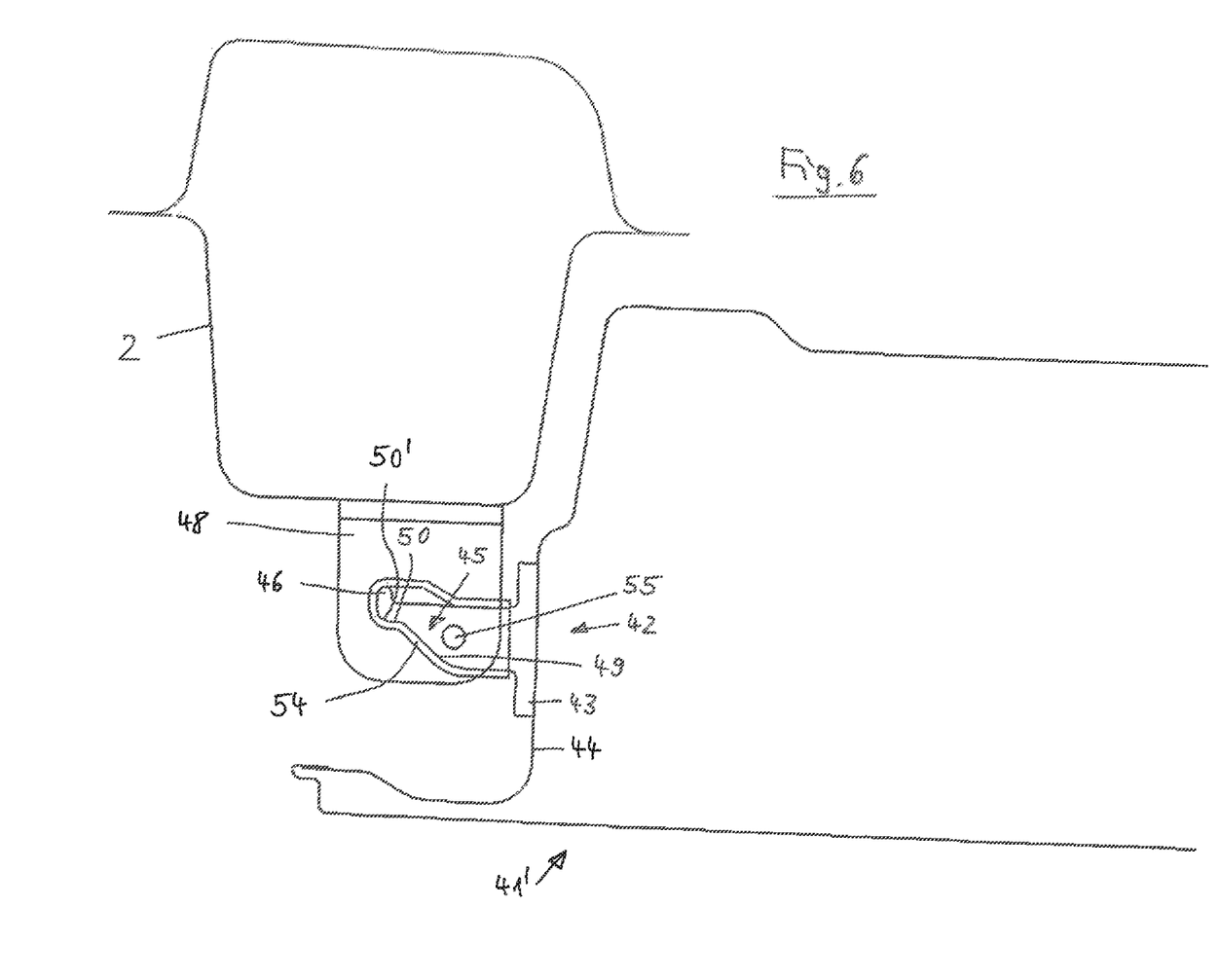
FIG. 6 shows the front part of a bodyshell sliding door, from which the sliding door of FIGS. 4 and 5 can be manufactured, in the closed position in a schematic view from above, together with a covering cap for the centering element.
Figure 7:
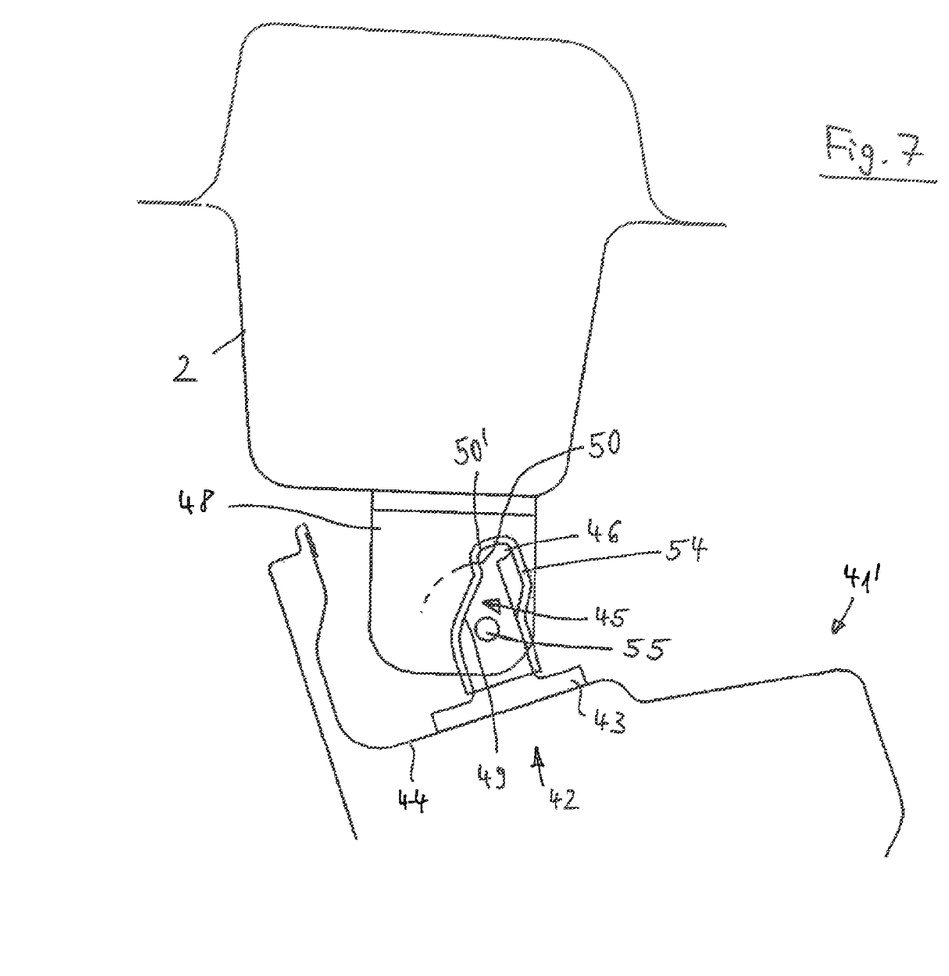
FIG. 7 shows the bodyshell sliding door of FIG. 6 in the open position.

FIGS. 6 and 7 show the front part of a bodyshell sliding door 41', from which the sliding door 41 of FIGS. 4 and 5 can be manufactured. Here, the centering element 42 is covered by a door-side covering cap 54. The covering cap 54 can be made of plastics. It is put onto the centering element 42. Preferably, the inside dimensions of the centering element 42 are slightly smaller than the associated outside dimensions of the centering element 42, so that the covering cap 54 is frictionally retained on the centering element 42. The centering element 42 including its centering surface 45 is covered and protected by the covering cap 54 during the painting operation.

To the centering element 42, to the covering cap 54 and to the body flange 48 a rotary hinge axle 55 can be mounted. For this purpose, the centering element 42, the covering cap 54 and the body flange 48 include receptacles into which the rotary hinge axle 55 can be inserted.

Before the painting operation, the bodyshell sliding door 41' is positioned at the B-pillar 2 such that the receptacles of the centering element 42, of the covering cap 54 and of the body flange 48 are in alignment with each other. In this position, the rotary hinge axle 55 is inserted into the receptacles, so that the bodyshell sliding door can be swivelled about the rotary hinge axle 55.

By swivelling about the rotary hinge axle 55, the bodyshell sliding door 41' can be swivelled with respect to the body-in-white. As referred to herein, a body-in-white refers to a plurality of un-painted sheet metal components of a car body that have been welded together, but without moving parts (doors, hoods, and deck lids as well as fenders), the motor, chassis sub-assemblies, or trim (glass, seats, upholstery, electronics, etc.). FIG. 6 shows the closed position of the bodyshell sliding door 41'. In this closed position, the bodyshell sliding door 41' fills the associated opening in the body-in-white. The bodyshell sliding door 41' is fixed in this position. Fixing can be effected by releasable clamps and/or in some other way. In this closed position as shown in FIG. 6, the immersion baths can be passed through.

In the open position as shown in FIG. 7, the steps of wet painting can be performed. It is possible to more or less open or close the bodyshell sliding door 41' during these method steps, which can also be effected several times depending on the requirement and which can be performed by industrial robots.

After performing the painting operation, the bodyshell sliding door 41' can be completed. Thus, guide rail, sliding carriage, multiple joint, pane, window regulator, interior trim and further parts can be mounted to the bodyshell sliding door 41'. Subsequently, the multiple joint of the completed sliding door is connected with the body. The completed sliding door then is connected with the body both by the rotary hinge axle 55 and by the multiple joint. By completing the bodyshell sliding door 41' to a sliding door 41, its weight is increased. This leads to the fact that the finished sliding door 41 sinks down, i.e. takes a lower position as compared to the position of the bodyshell sliding door 41' To provide for such lowering in the region of the centering element 42 and of the body flange 48, the cover 54 includes a bottom surface with a certain thickness. The bottom surface of the cover 54 lies between the base surface 57 of the body flange 48 and the lower end surface of the centering element 42. The thickness of this bottom surface is dimensioned such that lowering of the sliding door is made possible in z-direction.

Subsequently, the rotary hinge axle 55 is removed. The sliding door 41 can be removed from the B-pillar 2 by the sliding door mechanism. Now, the covering cap 47 can be removed from the centering element 42. Furthermore, the covering cap 56 can be mounted. The covering cap 56 can be put onto the body flange 48. The inside dimensions of the covering cap 56 can be slightly smaller than the associated outside dimensions of the body flange 48, so that the covering cap 56 is frictionally retained on the body flange 48. However, the covering cap 56 can also be connected with the body flange 48 and/or with the B-pillar 2 in some other way. On the covering cap 56 the counter surface 47 integral with the body is provided.

Figure 8:
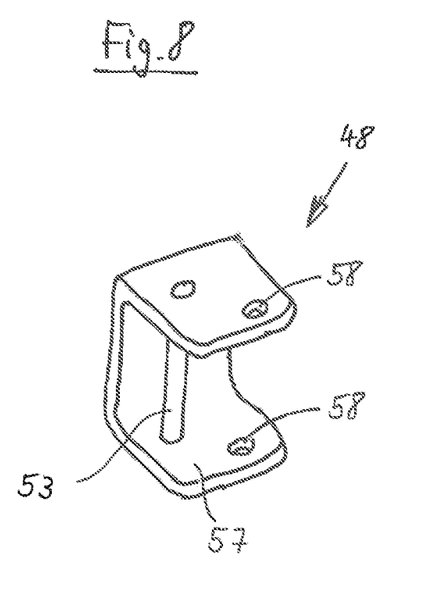
FIG. 8 shows a body flange in a perspective view.

FIG. 8 shows the body flange 40 in a perspective representation. It comprises the counter bearing 53 and receptacles 58 for the rotary hinge axle 55. The body flange 40 is of U-shaped design. Its base is attached to the B-pillar 2. The legs enclose the centering element 42.

By means of the present disclosure a mounting aid is created, which acts as rotary hinge for the alignment of the bodyshell sliding door in the body-in-white of the vehicle. The mounting aid furthermore acts both as painting aid in the painting process and as a future centering element of the sliding door. During the assembly with the corresponding functions for the mounting sequence, the mounting aid acts as rotary hinge. In the finished vehicle, the mounting aid acts as centering element for the sliding door function. In one additional embodiment, the present disclosure includes a method of manufacturing a portion of a vehicle, comprising aligning the bodyshell sliding door with the body-in-white of the vehicle via the centering element operating as a rotary hinge; and then the mounting a rotary hinge axle at the centering element during painting, including opening and closing the door during the painting, and receiving and centering the door via the centering element after assembly.

The invention claimed is:

1. A sliding door for a vehicle, comprising:
a guide rail;
a sliding carriage which is longitudinally movably mounted on the guide rail and which is connected with a body of the vehicle by a multiple joint; and
a centering element at an end of the sliding door, the centering element facing away from the multiple joint, wherein the centering element includes a centering surface which rests against a counter surface integral with the body, when the sliding door is closed, and wherein the centering surface includes a portion which extends inclined with respect to a longitudinal direction of the vehicle and the counter surface comprises an inclined portion against which the portion of the centering surface rests when the sliding door is closed.

2. The sliding door according to claim 1, wherein the centering surface includes a portion which extends parallel to the longitudinal direction of the vehicle.

3. The sliding door according to claim 1, wherein the centering element includes a catch hook.

4. The sliding door according to claim 1, wherein the counter surface of the body is provided on a cover.

5. A sliding door for a vehicle, comprising:
a guide rail;
a sliding carriage which is longitudinally movably mounted on the guide rail and which is connected with a body of the vehicle by a multiple joint; and
a centering element at its end facing away from the multiple joint, wherein the centering element is coverable by a covering cap.

6. The sliding door according to claim 5, wherein a rotary hinge axle is mountable at one or more of the centering element and at the covering cap.

7. The sliding door according to claim 5, wherein the sliding door is adjustable in a vertical direction by the covering cap.

8. A sliding door for a vehicle, comprising:
a guide rail;
a sliding carriage which is longitudinally movably mounted on the guide rail and which is connected with a body of the vehicle by a multiple joint; and
a centering element at an end of the sliding door, the centering element facing away from the multiple joint, wherein the centering element includes a centering surface which rests against a counter surface integral with the body, when the sliding door is closed, and wherein the centering element is coverable by a covering cap.

9. The sliding door according to claim 8, wherein the centering surface includes a portion which extends inclined with respect to a longitudinal direction of the vehicle.

10. The sliding door according to claim 9, wherein the centering surface includes a portion which extends parallel to the longitudinal direction of the vehicle.

11. The sliding door according to claim 10, wherein the centering element includes a catch hook.

12. The sliding door according to claim 11, wherein the counter surface of the body is provided on a cover.

13. The sliding door according to claim 11, wherein a rotary hinge axle is mountable at one or more of the centering element and at the covering cap.

14. The sliding door according to claim 13, wherein the sliding door is adjustable in a vertical direction by the covering cap.

* * * * *